(No Model.)

E. D. & O. B. REYNOLDS.
MAKING HARROW TEETH.

No. 316,569. Patented Apr. 28, 1885.

Witnesses:
J. Walter Fowler,
H. B. Applewhaite,

Inventors:
Edmund D. Reynolds,
Oliver B. Reynolds,
Per Attys
A. H. Evans & Co.

United States Patent Office.

EDMUND DUNBAR REYNOLDS AND OLIVER BRADFORD REYNOLDS, OF BROCKTON, MASSACHUSETTS.

MAKING HARROW-TEETH.

SPECIFICATION forming part of Letters Patent No. 316,569, dated April 28, 1885.

Application filed April 14, 1884. (No model.)

*To all whom it may concern:*

Be it known that we, EDMUND D. REYNOLDS and OLIVER B. REYNOLDS, of Brockton, in the county of Plymouth and State of Massachusetts, have invented certain Improvements in a Method of Making Harrow-Teeth; and we hereby declare the following to be a full, clear, and exact description thereof, reference being had to the accompanying drawings, making part of this specification, in which—

Figure 1:
Figure 2:
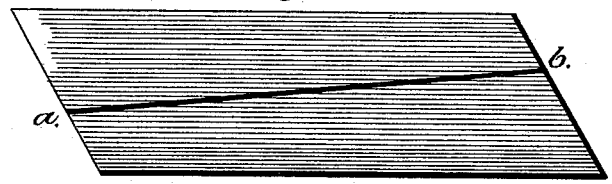
Figure 3:
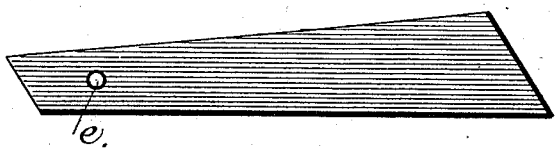
Figure 4:

Figure 1 illustrates a blank from which two blanks are to be cut. Fig. 2 shows the lines of incision necessary to make. Fig. 3 shows a completed blank. Fig. 4 illustrates a completed tooth.

Our invention relates to that class of harrow-teeth provided with a shank and cutting blade in one piece, and the cutting-blade bent out of the plane of the shank; and the object of our invention is to produce the teeth in a cheap and convenient manner, and is an improvement on Patent No. 246,558, issued to us August 30, 1881.

Our invention consists in first cutting the tooth-blank from a rhomboidal blank, said blank being divided by a diagonal longitudinal cut forming two tooth-blanks, as shown in in Fig. 3, and Fig. 4 illustrates a completed tooth.

In order that those skilled in the art may make and use our invention, we will proceed to describe the manner in which we have carried it out.

In the said drawings, Fig. 1 represents a rhomboidal sheet-metal blank, from which teeth-blanks, (see Fig. 2,) are cut by dividing said blank, Fig. 1, on a diagonal line, *a b*. At the same operation bolt-holes *e e* are punched, and we have a blank shaped as seen in Fig. 3, the lower portion of which is bent out of a plane with the shank-bars, as seen in Fig. 4. By this construction there is a considerable saving of material, as shorter rhomboidal blanks can be used to secure the same length of teeth. We have also ascertained by actual experiment that the cut on the ogee curve left an unnecessary width of metal on the lower portion of the blade, which involved an unnecessary consumption of metal.

We are aware that heretofore various kinds of agricultural-implement irons and harrow-teeth have been cut from blanks so laid out as to form more than one tooth at a single cut; hence we make no broad claim to such manner of cutting.

Having thus described our invention, what we claim as new, and desire to secure by Letters Patent, is—

The improved method herein described of making irregularly-shaped harrow-teeth, consisting, essentially, in cutting the rhomboidal blank A on the diagonal line *a b*, and bending the lower portion of the blades out of a plane with the shanks, substantially as and for the purpose set forth.

EDMUND DUNBAR REYNOLDS.
OLIVER BRADFORD REYNOLDS.

Witnesses as to signature of E. D. Reynolds:
WM. L. PUFFER,
LORING W. PUFFER.

Witnesses as to signature of O. B. Reynolds:
H. B. APPLEWHAITE,
DANIEL CLARK.